United States Patent [19]

Watanabe

[11] 4,371,123
[45] Feb. 1, 1983

[54] TAPE REEL

[75] Inventor: Koji Watanabe, Fujisawa, Japan

[73] Assignee: Nifco Inc., Yokohama, Japan

[21] Appl. No.: 239,006

[22] Filed: Feb. 27, 1981

[30] Foreign Application Priority Data

Feb. 28, 1980 [JP] Japan ............................ 55/24256[U]

[51] Int. Cl.³ ............................................ B65H 75/18
[52] U.S. Cl. .................................................. 242/71.8
[58] Field of Search ...................... 242/71.8, 71.9, 115, 242/116, 118.61, 118.62, 118.6, 197, 198, 199, 200

[56] References Cited

U.S. PATENT DOCUMENTS

| 4,226,381 | 10/1980 | Katata | 242/71.8 |
| 4,234,137 | 11/1980 | Watanabe | 242/71.8 |
| 4,262,856 | 4/1981 | Nakagawa | 242/71.8 |

Primary Examiner—Edward J. McCarthy

Attorney, Agent, or Firm—Schwartz & Weinrieb

[57] ABSTRACT

A plastic tape reel comprising a hub consisting of an outer cylindrical part adapted to permit a tape to be wound into a roll thereon and an inner cylindrical part defining a hollow pocket for engagement with the reel engaging shaft and two flanges attached one each to the opposite ends of the hub. The annular portion connecting the inner cylindrical part and the outer cylindrical part of the hub is bent in the axial direction throughout the entire circumferential extent so that the inner boundary thereof joins one axial end of the inner cylindrical part and the outer boundary thereof joins the outer cylindrical part at a location halfway along the entire axial length thereof. In the annular depression on the reverse side of the bent portion, a plurality of ribs are disposed in the radial directions and spaced by suitable circumferential intervals. The ribs serve as auxiliary paths for molten resin at the time the tape reel is injection molded.

6 Claims, 2 Drawing Figures

TAPE REEL

FIELD OF THE INVENTION

This invention relates to a tape reel, particularly to a plastic tape reel most suitable for use in video tape cassettes.

BACKGROUND OF THE INVENTION

Recently, the demand for video cassette tapes has been rapidly accelerating with the increasing popularity of video recording and playback machines as a contributory factor. Tape reels used in tapes of this type are made exclusively of plastic materials because of the ease with which such materials can be molded. Because of the purpose they serve, these reels have to be molded with extremely rigid tolerances in fabrication.

Plastic tape reels of quite satisfactory dimensional accuracy have been introduced to the market. However, since tape reels of this type are invariably required to pass the steps of thermal forming and curing, they tend to sustain sink marks during the step of curing. They have a common inherent problem that even the slightest deformation may possibly produce an adverse effect on the performance of the video recording and playback machine with which they are used.

As is widely known, the tape reel of this type comprises a pair of disc-shaped flanges connected axially to each other through the medium of an intervening hub. This hub consists of an outer cylindrical part adapted for a tape to be wound into a roll thereon and an inner cylindrical part disposed coaxially relative to the outer cylindrical part and provided therein with a space for admitting the insertion in the axial direction of a reel engaging shaft of the video recording and playback machine. One of the flanges is integrally molded at one end of the hub of such a construction, while the other flange is separately molded and afterward joined to the remaining end of the hub (which occurs as a free end at the time of molding) by means of ultrasonic welding or snapping engagement.

In the conventional tape reel, the portion which connects the inner cylindrical part and the outer cylindrical part of the hub in the radial direction has constituted an annular portion falling flush with the flange part of the integrally molded flange-and-hub combination. When this integral combination is molded in a molding die which has an injection gate at a position corresponding to the center of the free end of the hub part, it is imagined that the molten resin flows in diverse courses, some extending in axial directions from the outer edge of this annular portion to the edge of the outer cylindrical part and others extending in a branching manner in the radial directions to the periphery of the flange part. It is in the branched zone that the molded tape reel tends to sustain the aforementioned sink marks. Even when the edge portion supported by this annular portion is allowed to contract uniformly during the curing of the outer cylindrical part, the remaining axial end of the hub to which the separately molded flange is to be joined still tends to warp irregularly inwardly in the radial direction and impair the true circularity of the outer surface of the hub, possibly with the result that the produced tape reel will have to be rejected because the hub produces non-uniform rotation and causes an elongation in the tape would thereon.

In view of the shortcoming described above, there has been proposed a tape reel wherein the annular portion radially connecting the inner and outer parts of the hub is bent vertically throughout the entire circumferential extent so that the inner boundary of the annular portion joins one axial end of the inner cylindrical part and the outer boundary thereof joins the outer cylindrical part at a location halfway along the axial length thereof (Japanese Laid-open Patent Publication No. 97066/1980, U.S. Pat. No. 4,262,856).

When the paths for the flow of the molten resin to the outermost parts of the hub in the integrally molded hub-and-flange combination are considered with respect to the distances of travel from the aforementioned injection gate to the various points along the outermost boundary of the flange, they are found to vary because of the change in shape of the various parts of the hub and, consequently, the flow speed and flow volume of the molten resin proportionally vary from one path to another. Thus, it has been difficult to form the flange and the outer wall of the hub in exact circularity.

OBJECT OF THE INVENTION

One object of this invention is to provide a plastic tape reel comprising a hub consisting of an outer cylindrical part adapted for a tape to be wound into a roll thereon and an inner cylindrical part defining a socket for the reel engagement shaft and a pair of flanges attached one each to the opposite ends of the hub, which tape reel is so constructed that when one of the flanges is integrally molded at one end of the hub consisting of the inner cylindrical part and the outer cylindrical part, the joints of the parts are prevented from producing any sink mark and, at the same time, the flange and the hub are both molded in true circularity.

SUMMARY OF THE INVENTION

To accomplish the object described above according to the present invention, there is provided a tape reel which is so constructed that the annular portion for radially connecting the inner cylindrical part and the outer cylindrical part of the aforementioned hub is bent in the axial extent throughout the entire circumferential direction in order for the inner boundary of the annular portion to join one axial end of the inner cylindrical part and the outer boundary thereof to join the outer cylindrical part at a location halfway along the entire axial length thereof and the annular recess consequently formed on the reverse side of the bent portion of the aforementioned annular portion is provided with a plurality of suitably circumferentially spaced ribs formed in the radial direction. These ribs serve as auxiliary paths for the flow of molten resin at the time that the integrally formed hub-and-flange is injection molded. By the incorporation of these auxiliary paths for the molten resin, the courses of the travel of molten resin from the injection gate positioned at the center of the hub to the outermost edge of the flange are shortened and the flow speed of the molten resin is heightened. The product obtained as the result forms no sink mark and enjoys excellent dimensional accuracy.

The other objects and characteristics of the present invention will become apparent from the further disclosure of the invention to be made hereinbelow with reference to the accompanying drawing.

DESCRIPTION OF THE PREFERRED EMBODIMENTS

Figure 1:
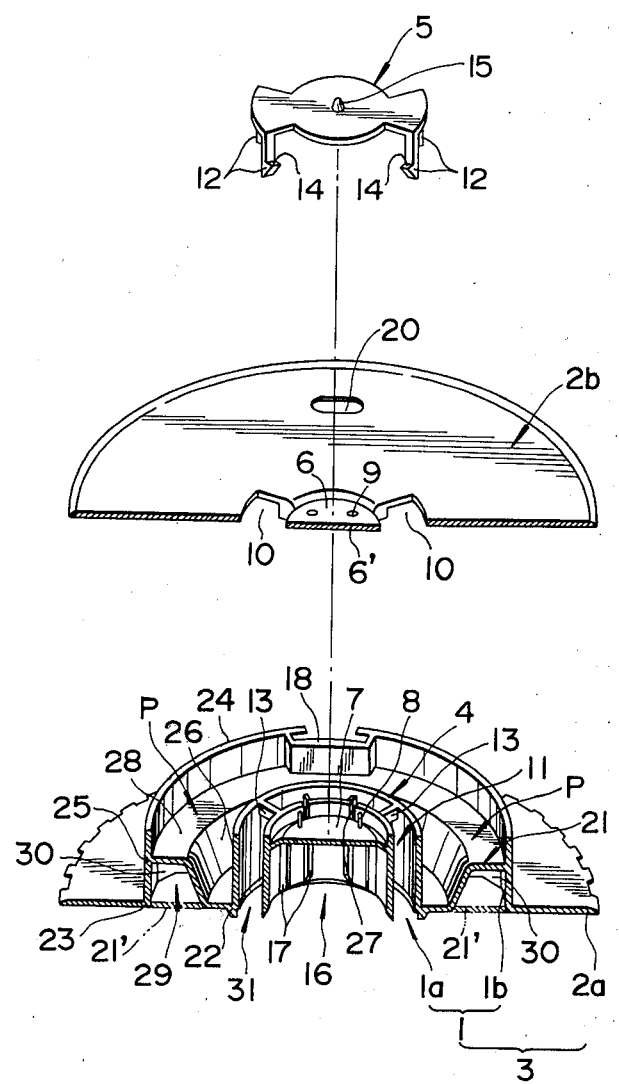
FIG. 1 is a partially sectioned, exploded perspective view of one embodiment of the tape reel provided by this invention.
Figure 2:
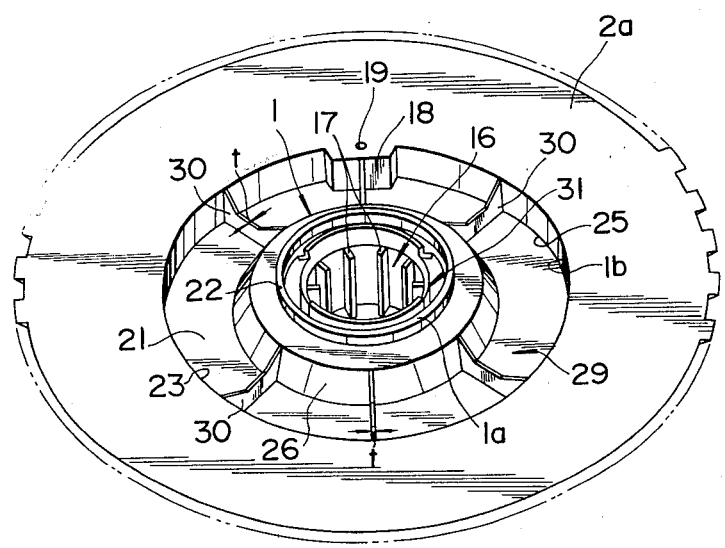
FIG. 2 is a perspective bottom view of the tape reel of FIG. 1.

FIG. 1 illustrates, in a partially sectioned, exploded perspective view, a tape reel contemplated for use in a video cassette tape and FIG. 2 represents a perspective bottom view of the integral combination of the hub and the flange to illustrate the characteristics of this invention to advantage. The half portions omitted from the drawing of FIG. 1 and the half portions illustrated therein are symmetrical relative to the plane intersecting the respective whole portions, with the exception of the tape retaining part to be fully described afterward.

In this tape reel like the conventional countertype, a hub 1 and a flange 2a at one axial end thereof are integrally molded of a plastic material to form a part 3, and a flange 2b at the other (free) end of the hub 1 is separately molded of a plastic material.

Various methods are available for the purpose of fastening the separate flange 2b to the free end 4 of the hub. The manner in which this fastening is accomplished is outside the technical scope of this invention. It may be effected by adopting any freely chosen known means such as, for example, ultrasonic welding or snapping engagement. In the case of the illustrated embodiment, this fastening is designed to be obtained by means of a resilient retainer piece formed on the cassette housing side and a fastener 5 possessed of a small protuberance 15 adapted for engagement with a resilient retainer piece in the recording and playback machine.

To be specific, the fastening is effected by admitting into the recess 7 in the free end 4 of the hub 1 the portion 6' of the central depression 6 protruding from the rear side of the separate flange 2b, optionally positioning the protruding portion 6' relative to the recess 7 so that the bosses 8 formed on the recess fit into the holes 9 formed in the depression 6 of the flange, then poising the fastener 5 from above and inserting the engaging legs 12 of the fastener through corresponding openings 10 of the flange 2b into circumferential grooves 11 in the free end 4 of the hub and allowing the claws 14 at the leading ends of the engaging legs to be caught on the lower surfaces of crosspieces 13 formed across the grooves. Consequently, the flange 2b is squeezed between the free end 4 of the hub and the fastener 5 and held fast in position. In the case of the illustrated embodiment, two pairs of engaging legs 12 are diametrically (180°) opposed to each other and the claws formed at the leading ends of the engaging claws of each pair are directed away from each other in the circumferential direction. Correspondingly, two pairs of crosspieces are formed in all, including the half portion omitted from the illustration. The number of these corresponding pairs may be greater, or the direction in which the claws are directed and the direction in which the crosspieces (stepped faces) are directed may be different from those illustrated.

Optionally, the fastener 5 may be dispensed with by directly providing the engaging legs 12 on the flange 2b.

The mere push-in engaging construction may be replaced by a construction such that the fastening of the flange to the hub is effected by applying the flange 2b to the hub and rotating them relative to each other thereby causing hooks to be brought into engagement with the corresponding crosspieces. In a construction designed for ultrasonic welding, the bosses such as are shown in the drawing may be elongated enough to pierce through and protrude from the corresponding holes 9 in the flange 2b and the protruding portions of the bosses can be crushed and welded onto the flange 2b with sufficient fastness to retain the flange 2b fast in position.

In this invention, the fastening may be accomplished by any of the methods described above. Besides the means required for the purpose of the fastening, the components of the tape reel of the present invention which are known to the art are as follows.

On one end of the hub, there is provided a small protuberance which is adapted to be held in position by a resilient piece (not shown) provided within the cassette. On the other end, there is provided an empty space 16 which opens at the aforementioned other end and extends in the axial direction. On the wall surface of this opening, a plurality of ribs 17 extending in the axial direction and projecting inwardly in the radial directions are spaced in the circumferential direction. The opening with these ribs is adapted to come into engagement with the reel engaging shaft (not shown) of the tape transport system. At one position in the external wall of the hub, there is provided a retainer 18 which is a radial depression for retaining in position the tape end. A stopper member (not illustrated) is used together with this retainer to pinch the tape end and keep it fast in position. To permit removal of the tape end which has been fastened as described above, the flange 2a in the integral combination is provided with a pinhole 19 (FIG. 2) through which a pin may be pierced upwardly to push up the stopper. Optionally, the separate flange may be provided with an opening 20 through which the stopper will be drawn out.

For the hub 1 to be made suitable for use with a tape designed exclusively for a relatively short period of video recording and playback, the outer cylindrical part 1b is given a diameter large enough to be amply separated from the inner cylindrical part 1 in the radial direction.

In the tape reel incorporating all these known components, the first point of improvement in accordance with this invention manifests itself in the construction of the annular portion 21 connecting the outer cylindrical part 1b and the inner cylindrical part 1a of the hub. In most conventional tape reels, the annular portion has assumed the shape of a simple ring serving to connect the axial edges 22, 23 of the inner and outer cylindrical parts 1a, 1b in the horizontal direction as indicated by an imaginary line 21' in FIG. 1. In the ordinary molding method wherein the molten resin is cast through the other end of the inner cylindrical part 1a, sink marks are caused along the joined portion (axial edge of the outer cylindrical part) between the annular connection portion 21', outer cylindrical part 1b and flange 2a to impair the dimensional accuracy of the flange 2a and that of the outer cylindrical part 1b. Moreover, the other end 24 of the outer cylindrical part is at times deformed by sustaining an inward twist as indicated by the arrow P, possibly degrading the strength of the produced tape reel.

In the present invention, the annular connection portion which spans in the radial direction is bent up toward the axial direction halfway along the radial width thereof so that while the inner boundary joins the axial edge 22 of the inner cylindrical part 1a, the outer boundary joins the outer cylindrical part 1b at a point 25 halfway along the axial length thereof.

Owing to this construction of the annular connection portion, the flow of the molten resin is extended in the direction of the outer cylindrical part from the connection point 25 as the branching point and, therefore, the distance over which the molten resin is contracted at the time of curing is uniformized and the inclination of the resin to be warped toward the interiors of the opposite edges 23, 24 of the outer cylindrical part is intercepted by the annular connection portion 21. Further, since the edge 23 of the outer cylindrical part forms part of the path to the flange 2a and constitutes a part of the path for the molten resin, no sink occurs on the surface of the flange. Thus, the produced tape reel is not impaired in dimensional accuracy or in commercial value.

In the case of the illustrated embodiment, the outer boundary in the radial direction of the annular connection portion 21 joins the outer cylindrical part at a point nearly halfway along the axial length. From the design point of view, this point may be varied in the vertical direction. It is not desirable for this point to be moved so much as to reach the other edge 24 of the outer cylindrical part 1b. This is because when the point reaches the other edge 24, the edge 23 to which the flange 2a is connected becomes liable to bend inwardly.

In addition to the construction described above, the rising of the annular connection portion 21 in the axial direction gives rise to an inwardly facing wall surface 26. Optionally, a plurality of reinforcing crosspieces (not shown) may be provided as suitably spaced in the circumferential direction between this wall 26 and the outer surface of the inner cylindrical part 1a. With a view to uniformizing the wall thicknesses of various parts as much as possible and ensuring the uniformity of the flow of molten resin and the speed of curing, the rear portions of the shaft engaging ribs 17 which would acquire a large wall thickness may be notched with slits 27.

The second characteristic of the present invention resides in the fact that since the annular connection portion 21 is bent up in the axial direction halfway along the distance from the inner cylindrical part 1a to the outer cylindrical part 1b as illustrated in FIG. 2, the portion which turns off in the horizontal direction from the upper end of the raised portion and reaches the outer cylindrical part 1b forms beneath its bottom a depression 29 as seen from the reverse side. Within this annular depression 29, a plurality of ribs are disposed in the radial directions and spaced at suitable circumferential intervals. These ribs 30 (six ribs spaced at angular intervals of 60° in the illustrated embodiment) are vestiges of the auxiliary flow paths which have served to distribute the molten resin outwardly in the radial direction during the injection molding of the integral combination within a molding die.

Now, the effect of these ribs 30 will be described. Generally, when the injection gate in the molding die is positioned at a point corresponding to the center of the free end 4 of the hub 1, for example, the paths for the molten resin from that gate to the various points on the outer wall of the hub and the outermost boundary of the integrated flange 2a vary considerably in length and the flow speed and flow volume of the molten resin also vary.

For example, the portion of the molten resin which flows through the molding chamber for the tape retainer 18 to the outermost boundary of the flange as illustrated has to follow a detour. When the tape reel is composed of the three component parts as illustrated and these parts are designed to be assembled by means of the part 5, separation of the parts after their assemblage may be accomplished by forming through openings 31 in the portions falling beneath the points of engagement between the engaging legs 12 and the crosspieces 13 thereby enabling a tool to be inserted through any of these openings 31. In this case, the paths for molten resin to the hub surface or the flange portions falling on the radial extensions of the openings 31 are also destined to follow detours.

When the integral combination is molded by regarding the paths for molten resin from the injection gate to the various points on the hub surface and on the outermost boundary of the flange without paying due attention to the different lengths of the paths as in the conventional method, it is difficult to impart true circularity to the hub and the flange. In an extreme case, the produced tape reel may sustain clearly visible lines or stripes of surface disturbance in the zones where the front lines of the molten resin have merged into one another during the molding.

The present invention, therefore, provides the ribs 30 serving concurrently as auxiliary paths for molten resin in the annular depression formed on the rear side of the annular connection portion to make it possible to design the lengths of the paths for the molten resin and the equivalent flow rates thereof at will.

For example, where the distribution of molten resin is retarded, the speed of its flow may be increased by increasing the thickness t of the ribs falling near the zone in question (that is by enlaring the widths of the paths of molten resin). Where the distribution occurs too fast, the speed of the flow may be lowered by decreasing the thickness t. Naturally from the standpoint of this concept, the number of these auxiliary paths for molten resin and the circumferential intervals separating these paths will be understood to be matters of design.

By this invention, the dimensional accuracy, the commercial value, and the like of the tape reel can be readily improved. Besides, the ribs concurrently serving as auxiliary paths for molten resin further function as reinforcements and, therefore, have an effect of imparting increased strength to the tape reel.

Obviously, many modifications and variations of the present invention are possible in light of the above teachings. It is therefore to be understood that within the scope of the appended claims, the present invention may be practiced otherwise than as specifically described herein.

What is claimed is:

1. In an injection-molded plastic tape reel comprising a hub which includes an inner cylindrical part defining a socket for engagement with a playback-machine shaft, and an outer cylindrical part adapted to permit a tape to be wound into a roll thereon, and flanges attached one each to the opposite ends of said hub, said inner cylindrical part and said outer cylindrical part being connected to each other through means of an annular portion which includes a lower, radially inner horizontally disposed portion, an intermediate axially-upward, radially-outward inclined portion, and an upper, radially outer horizontally disposed portion, said annular portion defining an annular recess therebeneath, said radially inner horizontal portion being joined to the lower axial end of said inner cylindrical part while the radially outer horizontal portion is joined to said outer cylindrical part at a location approximately halfway upwardly along the axial extent thereof, the improvement comprising:

radially extending means, connected between said inclined portion of said annular portion upon the undersurface thereof and the inner wall surface of said outer cylindrical part so as to span said annular recess, for providing a plurality of auxiliary flow paths for the molten resin during said injection molding of said tape reel directly between said radially inner portion of said annular portion and one of said flanges which is integrally molded with the lower axial end of said hub, said auxiliary flow paths being substantially shorter than the normal flow paths over which said molten resin would otherwise travel between said radially inner portion of said annular portion and said one of said flanges.

2. In said tape reel as set forth in claim 1, wherein:
said radially extending means comprises a plurality of circumferentially spaced reinforcement ribs.

3. In said tape reel as set forth in claim 2, wherein:
said reinforcement ribs are circumferentially spaced at angular intervals of 60°.

4. In said tape reel as set forth in claim 2, wherein:
said ribs are disposed within said annular recess within vertically disposed planes.

5. In said tape reel as set forth in claim 4, wherein:
the lower radially inner and radially outer ends of said ribs are disposed substantially flush within the same horizontal planes as said lower radially inner horizontally disposed portion of said annular portion and said one of said flanges.

6. In said tape reel as set forth in claim 2, wherein:
the thickness or width of said ribs may be predeterminedly varied in order to predeterminedly adjust the flow rate of said molten resin.

* * * * *